Aug. 9, 1960     L. KLEIN     2,948,843
VOLTAGE LIMITER
Filed Aug. 28, 1959
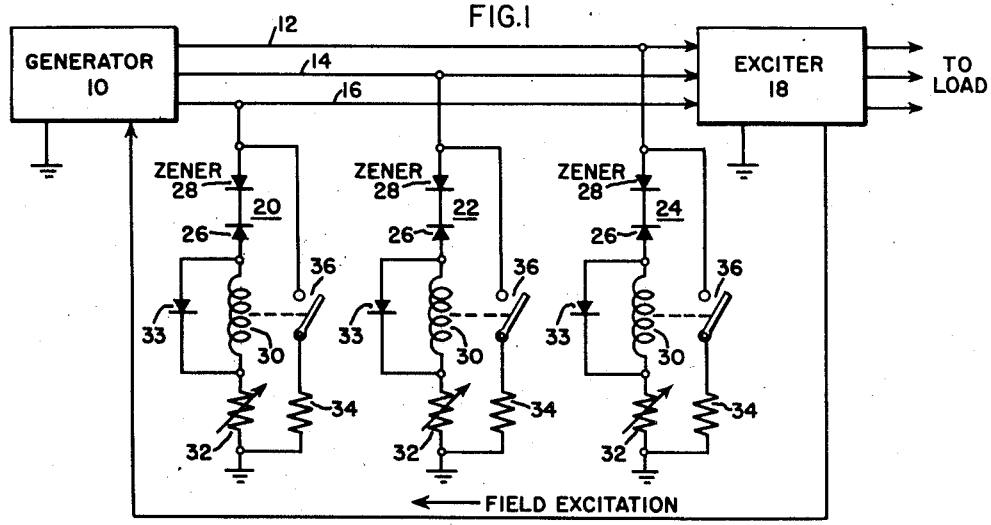
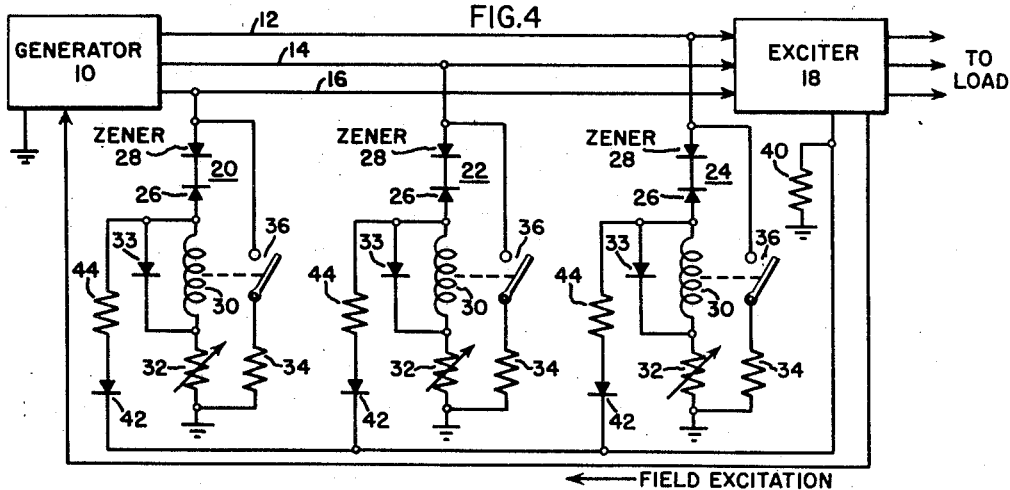
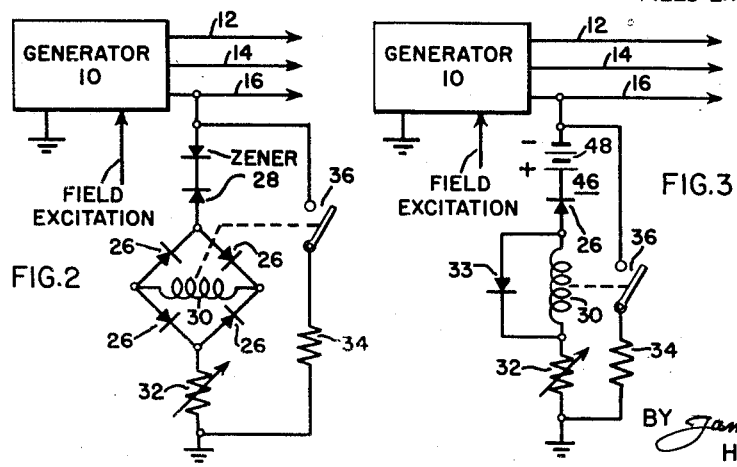
INVENTOR:
LEON KLEIN,
BY *James G. Williams*
HIS ATTORNEY.

United States Patent Office 2,948,843
Patented Aug. 9, 1960

2,948,843
VOLTAGE LIMITER

Leon Klein, Waynesboro, Va., assignor to General Electric Company, a corporation of New York Filed Aug. 28, 1959, Ser. No. 836,688

9 Claims. (Cl. 323—81)

The invention relates to a voltage limiter, and particularly to a voltage limiter for limiting voltage overshoot transients such as may result from circuit malfunctions or from removal of loads and faults.

Recently, semiconductor devices have been introduced and widely used in various electrical circuits. While the semiconductor devices have many advantages and applications, they are sensitive to overvoltages of even an extremely short time duration. In fact, some such devices can be damaged by a transient overvoltage having a duration of only a few cycles, at frequencies as high as 400 cycles. Consequently, their sensitivity to such overvoltages has limited their use and application.

Accordingly, an object of the invention is to provide an improved voltage limiter.

Accordingly, an object of the invention is to provide an improved voltage limiter.

Another object of the invention is to provide a novel voltage limiter for limiting the maximum voltage that a source of potential can apply to a load.

Another object of the invention is to provide an improved and novel voltage limiter which is rapid in operation.

Another object of the invention is to provide an improved and novel voltage limiter which is rapid in operation and which provides a stable limited voltage.

Briefly, these and other objects of the invention are attained by the application of a parasitic load to the power source whenever the voltage exceeds a predetermined value. This is acomplished by means of a series circuit coupled across the power lines which connect a source of voltage to a load. The series circuit includes a unidirectional current flow or rectifier device and also includes a reference potential source. The rectifier device and the reference potential source are poled in opposition. That is, the rectifier device permits or tends to permit a normal current flow through the series circuit in one direction and the reference potential source permits or tends to maintain a current flow through the series circuit in the opposite direction. However, under normal conditions of the power line, no current flows through the series circuit in either direction. By a proper selection of the characteristics and values of the rectifier device and the reference potential source, and upon the occurrence of a predetermined overvoltage on the line, current flows through the series circuit in a predetermined direction. Means are coupled to the series circuit and are responsive to the flow of current in the predetermined direction for coupling an additional load to the line. The coupling of the additional load to the line sharply limits the overvoltage transient, with the result that a substantially constant output voltage may be maintained despite such occurrences as by removal of a load, by the removal of a fault, or by the presence of other malfunctions.

The invention will be better understand from the following description taken in connection with the accompanying drawing and its scope will be pointed out in the claims. In the drawing:

Figure 1 shows an embodiment of a voltage limiter in accordance with the invention as used with an alternating current generator;

Figures 2 and 3 show other embodiments of the invention as used with an alternating current generator, these figures showing only a portion of the alternating current generator system and a corresponding portion of the voltage limiter; and Figure 4 shows another embodiment of a voltage limiter in accordance with the invention as also used with an alternating current generator.

In the drawing, the same reference numerals are used to refer to the same elements in the various figures. Figure 1 shows a voltage limiter in accordance with the invention as used with an alternating current generator 10, this being a three phase, Y-connected, grounded neutral generator. At the outset, it should be pointed out that while the invention is shown in all the figures as being used with an alternating current generator, the invention can be used equally well with other types of systems or devices in which it is desired to protect against voltage overshoot. The generator 10 supplies power to some load, as indicated by the arrows, over three lines 12, 14, 16. The generator 10 is also provided with a connection to a point of reference potential, such as the ground indicated. In addition to supplying power to a load, the generator also supplies power to an exciter 18, this exciter 18 being provided to supply the generator 10 with the necessary field excitation. As will be appreciated by persons skilled in the art, the field excitation for the generator 10 may be provided by some suitable means other than the exciter 18 shown in Figure 1.

Connected between each of the lines 12, 14, 16 and the point of reference potential are respective voltage limiters 20, 22, 24 in accordance with the invention. Each of the voltage limiters 20, 22, 24 includes a series circuit having a first unidirectional current flow or rectifier device 26, a Zener rectifier device or diode 28, and current flow responsive means such as a relay coil 30, and may further include an adjustable impedance element such as the adjustable resistor 32. A free wheeling rectifier device or diode 33 may be connected across or in parallel with the relay coil 30 so as to give the relay coil 30 better operating characteristics. The first rectifier device 26, the Zener diode 28, the relay coil 30, and the adjustable resistor 32 may be connected into the series circuit in any order desired. However, as shown, the relative polarities of the first rectifier devices 26 and the Zener diodes 28 must be maintained so that the normal or forward current flow through each of the first rectifier devices 26 is opposite to the normal or forward current flow through its associated Zener diode 28, and so that the normal or forward current flow through each of the first rectifier devices 26 is in the same direction as the reverse or backward current flow through its associated Zener diode 28. Each of the voltage limiters 20, 22, 24 also includes a load circuit connected between each of the lines 12, 14, 16 and the point of reference potential. Each of the load circuits comprises a series circuit having a load impedance element 34 and a set of contacts 36, each set of contacts 36 being associated with a respective one of the relay coils 30. Each set of contacts 36 is normally open, and becomes closed or engaged in response to current flow through its respective relay coil 30.

In a system such as described in connection with Figure 1, the values of the elements 26, 28, 30, 32 of the series circuits of each of the voltage limiters 20, 22, 24 are chosen or adjusted so that when the voltage across each Zener diode 28 exceeds a predetermined magnitude, the Zener diode 28 breaks down and permits current to flow therethrough in the reverse direction, namely from cathode to anode. In Figure 1, it will be seen that reverse current flow through each Zener diode 28 is in the same direction as the normal or forward current flow through its associated first rectifier device 26. During the portion of a cycle of operation of the generator 10 when the lines 12, 14, 16 are negative with respect to the point of reference potential, if the voltage magnitude on the lines 12, 14, 16 exceeds a predetermined level (set by the characteristic of the elements 26, 28, 30, 32 of the series circuit) that is sufficient to cause the Zener diodes 28 to break down and conduct in the reverse direction, current will flow from the point of reference potential through the adjustable resistors 32, through the relay coils 30, through the first rectifier devices 26 (in the forward direction), and through the Zener diodes 28 in the reverse direction. Current flow through the relay coils 30 will cause the associated sets of contacts 36 to close, whereby the load elements 34 are applied between the lines 12, 14, 16 and the point of reference potential. Upon the application of the load elements 34 to the lines 12, 14, 16, it will be seen that additional current will flow through the lines 12, 14, 16, this current also flowing through the internal impedance of the generator 10 so that the output or terminal voltage of the generator 10 is lowered. The amount by which the output voltage is so lowered depends, among other things, upon the magnitude of the impedance of the load elements 34. As each of the lines 12, 14, 16 becomes excessively negative during its respective period in a cycle of operation, a respective load element 34 is coupled to the lines 12, 14, 16. Thus, a balanced type of load is provided across each of the lines 12, 14, 16 to limit the output voltage of the generator 10. Once current begins to flow through the relay coils 30, the free wheeling diodes 33 tend to maintain the current flow in the same direction through their respective relay coils 30 during the positive portions which follow the negative portions of subsequent cycles. Hence, the relay coils 30 remain energized as long as a predetermined excessively negative voltage, with respect to the point of reference potential, is present on, or recurs on, the lines 12, 14, 16.

In connection with Figure 1, while the series circuits of the voltage limiters 20, 22, 24 are arranged to permit current to flow when the lines 12, 14, 16 are excessively negative with respect to the point of reference potential, additional voltage limiters or substitutional voltage limiters may be connected to the lines 12, 14, 16 to permit current to flow through the series circuits of the additional voltage limiters when the lines 12, 14, 16 are excessively positive with respect to the point of reference potential. Thus, excessive voltages can be limited during both the positive and negative portions of a cycle of operation. The additional or substitutional voltage limiters would comprise first rectifier devices 26 and Zener diodes 28 having their respective polarities reversed with respect to the polarities shown in Figure 1. Or, the voltage limiters may comprise a full wave bridge rectifier arrangement such as shown in Figure 2. The bridge rectifier arrangement comprises four of the first rectifiers 26 connected to form the bridge, the relay coil 30, and two Zener diodes 28 connected in series with their respective polarities reversed. If the voltage on the line 16 is excessive in a positive direction, the lower Zener diode 28 conducts in the reverse direction and the upper Zener diode 28 conducts in the forward direction to provide a current flow that energizes the relay coil 30. If the voltage on the line 16 is excessive in a negative direction, the upper Zener diode 28 conducts in the reverse direction and the lower Zener diode 28 conducts in the forward direction to provide a current flow that energizes the relay coil 30. Energization of the relay coil 30 causes the contacts 36 to close and apply the load elements 34 to the lines. The arrangement shown in Figure 2 is partial in that it shows a voltage limiter for only one of the lines, namely line 16. If there are additional lines, such as the other lines 12, 14, additional limiters can be used. Persons skilled in the art will appreciate that if the generator 10 produces direct current, only one voltage limiter is needed since the line polarity does not change.

Figure 3 shows another embodiment of a voltage limiter 46 in accordance with the invention, the arrangement shown in Figure 3 being partial in that it shows the voltage limiter for only one of the lines, namely line 16. The voltage limiter 46 shown in Figure 3 is similar to the voltage limiter 20 shown in Figure 1. However, in the limiter of Figure 3, a source of unidirectional potential 48 has been substituted for the Zener diode 28. The source of unidirectional potential 48 is poled or connected into the series circuit in such a manner that it tends to maintain or cause a current flow through the series circuit that opposes or that is in opposition to the normal or forward current flow through the first rectifier device 26. The magnitude or the source of unidirectional potential 48 is set at some value. When the potential on the line 16 exceeds a predetermined magnitude in a negative direction, a current flows from the point of reference potential, through the relay coil 30, through the first rectifier device 26 in the forward direction, and through the source of unidirectional potential 48 from its positive terminal to its negative terminal to the line 16. This current flow through the relay coil 30 causes the set of contacts 36 to close. It is to be understood that although Figure 3 shows the voltage limiter for only one line, a similar type of limiter may also be provided for the other lines 14, 16 of the generator 10. Likewise, it is to be understood that the polarity of the source of unidirectional potential 48 may be reversed if the polarity of the first rectifier device 26 is also reversed so as to protect against overvoltages in the positive direction on the lines.

An important advantage of the voltage limiters 20, 22, 24, 46 shown in Figures 1, 2, and 3 lies in the fact that the load elements 34 are connected to the lines 12, 14, 16 between the generator 10 and the exciter 18. This is done so that the load elements 34 are not connected to the lines 12, 14, 16 at a point beyond the exciter 18 toward the load. Some types of exciters produce increased excitation with increased load current. If this type of exciter were connected in the line between the generator and the load and if the load elements 34 were connected at a point beyond the exciter 18 toward the load, then the additional load current of the voltage limiter would pass through the exciter 18 and thereby supply an additional excitation for the generator 10. This additional excitation would be an undesirable condition when excessive voltages are present. Thus, the voltage limiter in accordance with the invention takes power and reduces voltage from the generator 10 and still does not supply additional excitation current.

Figure 4 shows another embodiment of a voltage limiter in accordance with the invention, the elements of Figure 4 which are common to Figures 1, 2, and 3 having the same reference numerals. While the voltage limiters shown in the preceding figures provide excellent voltage limiting after a very few cycles of voltage overshoot, it is still desirable in some instances to have an even more rapid voltage limiting, say after 1 cycle of voltage overshoot. In order to limit the voltage during the first few cycles, a premeditator is added to the voltage limiter. The premeditator operates on the basis that the excitation current to the generator field is higher for the load or fault conditions whose removal gives a faster voltage overshoot during the first few cycles than for other load or fault conditions. The premeditator comprises a bias impedance element or resistor 40 connected between one side of the exciter 18 and the point of reference potential. This one side is shown connected directly to the point of reference potential in Figure 1.

In addition, the premeditator includes a series circuit comprising a blocking rectifier device 42 and a calibrating resistor 44 connected between the one side of the exciter 18 and each of the relay coils 30. In Figure 4, it is seen that the connection of the calibrating resistor 44 to the relay coil 30 is made on the side of the relay coil 30 which would be more negative than the reference potential for a current flow through the first rectifier 26 having the polarity shown. Thus, when the excitation current supplied by the exciter 18 exceeds a predetermined magnitude, as it might by the development of a fault or short circuit, a voltage also exceeding a predetermined magnitude is developed across the bias resistor 40. This voltage causes a current to flow along a path beginning at the point of reference potential, through the adjustable resistor 32, through the relay coil 30, through the calibrating resistor 44, through the blocking rectifier device 42, and through the bias resistor 40 back to the point of reference potential. This current flow through the relay coil 30 energizes the coil 30 and closes the respective sets of contacts 36 to apply the load elements 34 to the lines 12, 14, 16. Hence, the load elements 34 are applied to the lines 12, 14, 16 to hold down the voltage overshoot when the fault or short circuit is removed. As explained in connection with Figure 1, additional or substitutional limiters with the first rectifier devices 26 and Zener diodes 28 having their polarities reversed with respect to Figure 2 may be added or used in place of the arrangement shown to provide the flow of current through the relay coil 30 in the opposite direction, that is, downwardly as viewed in Figure 2 toward the point of reference potential. It is understood that the premeditator circuit can be used equally well with other means of sensing field excitation such as by the sensing of field current. A fast action of the voltage limiter can also be obtained by using switching devices having fast operating times instead of the relay coil 30. Such fast devices include vacuum tubes, gas filled tubes and control rectifiers.

While the invention has been described in connection with a relay coil 30 and associated sets of contacts 36, it is to be understood that the invention can be used equally well with other current sensitive or switching devices, such as saturable reactors, vacuum tubes, gas filled tubes or controlled rectifiers, or other voltage breakdown devices. In addition, it is to be understood that the invention can be used equally well with single phase generating systems or systems having a source of potential and a load other than three phase arrangement shown in figures. While the invention has been described with reference to particular embodiments, it is to be understood that modifications may be made by persons skilled in the art without departing from the spirit of the invention or from the scope of the claims.

What I claim as new and desire to secure by Letters Patent of the United States is:

1. A circuit for limiting, to a predetermined magnitude, the voltage on a line adapted to be coupled between a source of voltage and a load, comprising a series circuit coupled to said line, said series circuit including a unidirectional current flow device and a reference potential source poled in opposition to each other, and means responsive to a flow of current through said unidirectional current flow device for coupling an additional load to said line.

2. A circuit for limiting, to a predetermined magnitude, the voltage on a line adapted to be coupled between a source of voltage and a load, comprising a series circuit coupled to said line, said series circuit including a rectifier device poled to favor current flow through said series circuit in one direction and a reference potential source poled to sustain current flow through said series circuit in the opposite direction, and means responsive to a flow of current through said series circuit in said one direction for coupling an additional load to said line.

3. A circuit for limiting, to a predetermined magnitude, the voltage on a line adapted to be coupled between a source of voltage and a load, comprising a series circuit coupled to said line, said series circuit including a rectifier device coupled into said series circuit to permit a normal current flow therein in one direction and a reference potential device coupled into said series circuit to support a current flow therein in the opposite direction, and means responsive to a flow of current through said series circuit in said one direction for coupling an additional load to said line.

4. A circuit for limiting, to a predetermined magnitude, the voltage on a line adapted to be coupled between a source of voltage and a load, comprising a series circuit coupled to said line, said series circuit including a first rectifier device coupled into said series circuit to permit current to flow through said series circuit in substantially only one direction and said series circuit further including a second rectifier device coupled into said series circuit to normally permit current to flow through said series circuit in the opposite direction and to permit current to flow through said series circuit in said one direction in response to a potential that exceeds a predetermined magnitude, and means responsive to a flow of current through said series circuit in said one direction for coupling an additional load to said line.

5. A circuit for limiting, to a predetermined magnitude, the voltage on a line adapted to be coupled between a source of voltage and a load, comprising a series circuit coupled to said line, said series circuit including a first rectifier device coupled into said series circuit to permit current to flow through said series circuit in substantially only one direction and said series circuit further including a source of unidirectional reference potential coupled into said series circuit to maintain a current flow through said series circuit in the opposite direction and to permit current to flow through said series circuit in said one direction in response to a potential that exceeds a predetermined magnitude, and means responsive to a flow of current through said series circuit in said one direction for coupling an additional load to said line.

6. A system for limiting, to a predetermined magnitude, the voltage between a line and a point of reference potential, said line being adapted to be coupled between a source of potential and a load; comprising a series circuit coupled between said line and said point of reference potential, said series circuit comprising a first rectifier device coupled into said series circuit to permit current to flow through said series circuit in substantially only a first direction, a second rectifier device that permits a normal current to flow therethrough in a given direction and that permits an abnormal current to flow therethrough in an opposite direction in response to a source of potential that exceeds a certain magnitude, said second rectifier device being coupled into said series circuit so that said normal current flow permitted by said second rectifier device is a direction opposite to said first direction and so that said abnormal current flow permitted by said second rectifier device is in said first direction; switching means coupled to said series circuit and responsive to current flow in said first direction through said series circuit; and loading means adapted to be coupled between said line and said point of reference potential in response to said switching means responding to current flow in said first direction through series circuit.

7. A system for limiting, to a predetermined magnitude, the voltage between a line and a point of reference potential, said line being adapted to be coupled between a source of potential and a load; comprising a series circuit coupled between said line and said point of reference potential, said series circuit comprising a first rectifier device coupled into said series circuit to permit current to flow through said series circuit in substantially only a first direction, a source of unidirectional potential that causes a normal current to flow therefrom in a given direction, said source of unidirectional potential being coupled into said series circuit so that said normal current flow caused by said source of unidirectional potential is in a direction opposite to said first direction; switching means coupled to said series circuit and responsive to current flow in said first direction through said series circuit; and loading means adapted to be coupled between said line and said point of reference potential in response to said switching means responding to current flow in said first direction through said series circuit.

8. A circuit for limiting, to a predetermined magnitude, the voltage on a line adapted to be coupled between a source of voltage and a load, comprising a series circuit coupled to said line; said series circuit including current responsive means and a rectifier bridge arrangement coupled to said current responsive means to permit current to flow through said current responsive means in only one direction, a first rectifier device coupled into said series circuit to normally permit current to flow through said series circuit in one direction and to permit current to flow through said series circuit in the opposite direction in response to a potential that exceeds a predetermined magnitude, a second rectifier device coupled into said series circuit to normally permit current to flow through said series circuit in said opposite direction and to permit current to flow through said series circuit in said one direction in response to a second potential that exceeds a predetermined magnitude; and means responsive to current flow through said current responsive means for coupling an additional load to said line.

9. A circuit for limiting, to a predetermined magnitude, the voltage on a line adapted to be coupled between a source of voltage and a load, comprising a series circuit coupled to said line; said series circuit including a first rectifier device coupled into said series circuit to permit current to flow through said series circuit in substantially only one direction and said series circuit further including a unidirectional reference potential device coupled into said series circuits to enable a current to flow through said series circuit in the opposite direction and to permit current to flow through said series circuit in said one direction in response to a potential that exceeds a predetermined magnitude; first means responsive to a flow of current through said series circuit in said one direction for coupling an additional load to said line; and second means coupled to said line and to said first means to cause a current to flow through at least a portion of said series circuit in response to a current flow in said line that exceeds a predetermined magnitude for coupling an additional load to said line.

No references cited.